US010206199B2

(12) United States Patent
Jung et al.

(10) Patent No.: US 10,206,199 B2
(45) Date of Patent: Feb. 12, 2019

(54) METHOD AND APPARATUS FOR PARTITIONING RADIO RESOURCES IN WIRELESS COMMUNICATION SYSTEM

(71) Applicant: LG ELECTRONICS INC., Seoul (KR)

(72) Inventors: Sunghoon Jung, Seoul (KR); Youngdae Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 119 days.

(21) Appl. No.: 15/023,958

(22) PCT Filed: Oct. 2, 2014

(86) PCT No.: PCT/KR2014/009322
§ 371 (c)(1),
(2) Date: Mar. 22, 2016

(87) PCT Pub. No.: WO2015/050396
PCT Pub. Date: Apr. 9, 2015

(65) Prior Publication Data
US 2016/0249336 A1    Aug. 25, 2016

Related U.S. Application Data

(60) Provisional application No. 61/886,513, filed on Oct. 3, 2013.

(51) Int. Cl.
*H04W 4/08* (2009.01)
*H04W 8/00* (2009.01)
(Continued)

(52) U.S. Cl.
CPC ......... *H04W 72/0406* (2013.01); *H04W 4/08* (2013.01); *H04W 4/80* (2018.02);
(Continued)

(58) Field of Classification Search
None
See application file for complete search history.

(56) References Cited

U.S. PATENT DOCUMENTS 8,804,756 B2   8/2014  Tseng
8,848,700 B2   9/2014  Ahn et al.
(Continued)

FOREIGN PATENT DOCUMENTS

KR    1020130065373 A    6/2013
WO    2013-025040 A2    2/2013
WO    2013115567 A1    8/2013

OTHER PUBLICATIONS

3rd Generation Partnership Project; Technical Specification Group Services and System Aspects; Study on architecture enhancements to support Proximity Services (ProSe) (Release 12), 3GPP TR 23.703 V0.4.1 (Jun. 2013).
(Continued)

*Primary Examiner* — Mark H Rinehart
*Assistant Examiner* — Angel T Brockman
(74) *Attorney, Agent, or Firm* — Dentons US LLP

(57) ABSTRACT

A method and apparatus for configuring radio resources for a device-to-device (D2D) operation in a wireless communication system is provided. A user equipment (UE) configures two types of radio resources which include a first type of radio resources and a second type of radio resources. The first type of radio resources is used for the D2D communication, and the second type of radio resources is used for communication between the UE and a network. Then, the UE performs the D2D communication by using the first type of radio resources upon receiving a D2D radio network temporary identifier (D-RNTI) for the D2D communication.

12 Claims, 11 Drawing Sheets

(51) Int. Cl.
| | |
|---|---|
| *H04W 72/04* | (2009.01) |
| *H04W 76/23* | (2018.01) |
| *H04W 76/14* | (2018.01) |
| *H04W 4/80* | (2018.01) |
| *H04W 36/00* | (2009.01) |
| *H04W 36/36* | (2009.01) |
| *H04W 72/12* | (2009.01) |
| *H04W 4/90* | (2018.01) |
| *H04W 84/04* | (2009.01) |

(52) U.S. Cl.
CPC ....... *H04W 8/005* (2013.01); *H04W 36/0016* (2013.01); *H04W 36/0072* (2013.01); *H04W 36/36* (2013.01); *H04W 72/042* (2013.01); *H04W 72/0486* (2013.01); *H04W 72/121* (2013.01); *H04W 72/1284* (2013.01); *H04W 76/14* (2018.02); *H04W 76/23* (2018.02); *H04W 4/90* (2018.02); *H04W 84/042* (2013.01)

(56) References Cited

U.S. PATENT DOCUMENTS

| | | | |
|---|---|---|---|
| 8,918,111 | B2 | 12/2014 | Shin et al. |
| 8,977,276 | B2 | 3/2015 | Koskela et al. |
| 9,002,281 | B2 | 4/2015 | Fwu et al. |
| 9,019,913 | B2 | 4/2015 | Madan et al. |
| 9,084,241 | B2 | 7/2015 | Madan et al. |
| 9,089,001 | B2 | 7/2015 | Ratasuk et al. |
| 9,107,202 | B2 | 8/2015 | Doppler et al. |
| 9,237,519 | B2 | 1/2016 | Su et al. |
| 9,338,726 | B2 | 5/2016 | Krishnaswamy et al. |
| 9,414,423 | B2 | 8/2016 | Ro et al. |
| 9,420,551 | B2 | 8/2016 | Park |
| 9,426,781 | B2 * | 8/2016 | Kim ................... H04W 76/023 |
| 9,456,330 | B2 | 9/2016 | Cheng et al. |
| 9,591,671 | B2 | 3/2017 | Yamazaki et al. |
| 9,719,383 | B2 | 8/2017 | Yamazaki et al. |
| 9,763,273 | B2 | 9/2017 | Fukuta |
| 9,788,328 | B2 | 10/2017 | Tavildar et al. |
| 2011/0306349 | A1 | 12/2011 | Hakola et al. |
| 2013/0059583 | A1 | 3/2013 | Van Phan et al. |
| 2013/0109301 | A1 | 5/2013 | Hakola et al. |
| 2013/0223370 | A1* | 8/2013 | Larmo ................ H04W 76/021 370/329 |
| 2013/0244661 | A1 | 9/2013 | Lin et al. |
| 2013/0288668 | A1 | 10/2013 | Pragada et al. |
| 2013/0294283 | A1 | 11/2013 | Van Phan et al. |
| 2013/0322413 | A1* | 12/2013 | Pelletier ............ H04W 72/1289 370/336 |
| 2013/0324114 | A1 | 12/2013 | Raghothaman et al. |
| 2014/0003262 | A1* | 1/2014 | He ........................ H04W 28/08 370/252 |
| 2014/0038653 | A1 | 2/2014 | Mildh et al. |
| 2014/0044024 | A1 | 2/2014 | Zou et al. |
| 2014/0064163 | A1 | 3/2014 | Tsirtsis et al. |
| 2014/0094183 | A1 | 4/2014 | Gao et al. |
| 2014/0185495 | A1 | 7/2014 | Kuchibhotla et al. |
| 2014/0226504 | A1 | 8/2014 | Tavildar et al. |
| 2014/0328329 | A1 | 11/2014 | Novlan et al. |
| 2015/0043438 | A1* | 2/2015 | Fwu ...................... H04W 28/24 370/329 |
| 2015/0071189 | A1 | 3/2015 | Park et al. |
| 2015/0085791 | A1 | 3/2015 | Baghel |
| 2015/0222401 | A1 | 8/2015 | Xu et al. |
| 2015/0245192 | A1 | 8/2015 | Wu et al. |
| 2015/0319737 | A1 | 11/2015 | Cheng et al. |
| 2016/0057604 | A1 | 2/2016 | Luo et al. |
| 2016/0183276 | A1 | 6/2016 | Marinier et al. |
| 2016/0227518 | A1 | 8/2016 | Li et al. |
| 2016/0249283 | A1 | 8/2016 | Yu et al. |
| 2016/0249297 | A1 | 8/2016 | Oh et al. |
| 2016/0249341 | A1 | 8/2016 | Jung et al. |
| 2016/0249355 | A1 | 8/2016 | Chae et al. |
| 2016/0278045 | A1 | 9/2016 | Adachi et al. |

OTHER PUBLICATIONS

Hong et al., "Analysis of Device-to-Device Discovery and Link Setup in LTE Networks", Personal Indoor and Mobile Radio Communication (PIMRC), 2013 IEEE 24th International Symposium on pp. 2856-2860, Sep. 11, 2013.
Office Action of Korean Patent Office in Appl'n No. 10-2016-7008453, dated Jan. 21, 2017.
Catt, 'Resource allocation for D2D discovery', R1 133033, 3GPP TSG RAN WGT Meeting #74, Barcelona, Spain, Aug. 19-23, 2013 (http://www.3gpp.org/ftp/tsg_ran/WG1_RL1/TSGR1-74/Docs/R1-133033.zip) See sections 2.1-2.2.
Catt, 'Consideration on D2D communication', R1-133030, 3GPP TSG RAN WG1 Meeting #74, Barcelona, Spain, Aug. 19-23, 2013 (http://www.3gpp.org/ftp/tsg_ran/WG1_RL1/TSGR1-74/Docs/R1-133030.zip) See sections 2.1 3.5.
LG Electronics, 'Resource Management for D2D Communication', R1-133385, 3GPP TSG RAN WG1 Meeting #74, Barcelona, Spain, Aug. 19-23, 2013 (http://www.3gpp.org/ftp/tsg_ran/WG1_RL1/TSGR1-74/Docs/R1-133385.zip) See sections 2-5.
Alcatel Lucent Shanghai Bell et al., 'D2D discovery performance', R1 132996, GPP TSG RAN WG1 Meeting #74, Barcelona, Spain, Aug. 19-23, 2013 (http://www.3gpp.org/ftp/tsg_ran/WG1_RL1/TSGR1-74/Docs/R1-132996.zip) See sections 2-3.
Search Report of European Patent Office in Appl'n No. 14851257.7, dated Apr. 3, 2017.
Office Action of European Patent Office in Appl'n No. 14851257.7, dated Aug. 2, 2017.
Office Action of the U.S. Patent Office in U.S. Appl. No. 15/023,992, dated Jan. 10, 2018.
Office Action of the U.S. Patent Office in U.S. Appl. No. 15/024,778, dated Jan. 22, 2018.
Office Action of the U.S. Patent Office in U.S. Appl. No. 15/023,589, dated May 18, 2017.
Office Action of the U.S. Patent Office in U.S. Appl. No. 15/023,992, dated Jul. 12, 2018.
Catt: "Consideration on D2D Discovery", R2-133216, 3GPP TSG RAN WG2 Meeting #83bis, Ljubljana, Slovenia, Oct. 7-11, 2013.
Intel Corporation: "Multi-Carrier WAN-ProSe operation", R2-143234, 3GPP TSG RAN WG2 Meeting #87, Dresden, Germany, Aug. 18-22, 2014.
Nokia: "D2D Discovery Signal Considerations", R1-133498, 3GPP TSG RAN WG1 Meeting #74, Barcelona, Spain, Aug. 19-23, 2013.
Fujitsu: "Discussion on ProSe direct discovery", R2-133393, 3GPP TSG RAN WG2 Meeting #83bis, Ljubljana, Slovenia, Oct. 7-11, 2013.
LG Electronics: "Resource Management for D2D Communications," 3GPP TSG RAN WG1 Meeting #74, Aug. 19-23, 2013, R1-133791.
ZTE: "Considerations on UE RRC state," 3GPP TSG-RAN WG2 Meeting #83bis, Oct. 7-11, 2013, R2-133204.

* cited by examiner (a)

(b)

METHOD AND APPARATUS FOR PARTITIONING RADIO RESOURCES IN WIRELESS COMMUNICATION SYSTEM

This application is a National Stage Entry of International Application No. PCT/KR2014/009322, filed on Oct. 2, 2014, and claims the benefit of and priority to Provisional Application No. 61/886,513, filed Oct. 3, 2013, each of which are hereby incorporated by reference in its entirety for all purposes as if fully set forth herein.

BACKGROUND OF THE INVENTION

Field of the Invention

The present invention relates to wireless communications, and more specifically, to a method and apparatus for partitioning radio resources in a wireless communication system.

Related Art

Universal mobile telecommunications system (UMTS) is a $3^{rd}$ generation (3G) asynchronous mobile communication system operating in wideband code division multiple access (WCDMA) based on European systems, global system for mobile communications (GSM) and general packet radio services (GPRS). A long-term evolution (LTE) of UMTS is under discussion by the $3^{rd}$ generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Recently, there has been a surge of interest in supporting direct device-to-device (D2D) communication. This new interest is motivated by several factors, including the popularity of proximity-based services, driven largely by social networking applications, and the crushing data demands on cellular spectrum, much of which is localized traffic, and the under-utilization of uplink frequency bands. 3GPP is targeting the availability of D2D communication in LTE rel-12 to enable LTE become a competitive broadband communication technology for public safety networks, used by first responders. Due to the legacy issues and budget constraints, current public safety networks are still mainly based on obsolete 2G technologies while commercial networks are rapidly migrating to LTE. This evolution gap and the desire for enhanced services have led to global attempts to upgrade existing public safety networks. Compared to commercial networks, public safety networks have much more stringent service requirements (e.g., reliability and security) and also require direct communication, especially when cellular coverage fails or is not available. This essential direct mode feature is currently missing in LTE.

From a technical perspective, exploiting the nature proximity of communicating devices may provide multiple performance benefits. First, D2D user equipments (UEs) may enjoy high data rate and low end-to-end delay due to the short-range direct communication. Second, it is more resource-efficient for proximate UEs to communicate directly with each other, versus routing through an evolved NodeB (eNB) and possibly the core network. In particular, compared to normal downlink/uplink cellular communication, direct communication saves energy and improves radio resource utilization. Third, switching from an infrastructure path to a direct path offloads cellular traffic, alleviating congestion, and thus benefiting other non-D2D UEs as well. Other benefits may be envisioned such as range extension via UE-to-UE relaying.

Radio resources may be partitioned into radio resources for a D2D operation and radio resources for a normal operation, i.e., communication between the eNB and UE. A method for partitioning radio resources for a D2D operation may be required.

SUMMARY OF THE INVENTION

The present invention provides a method and apparatus for partitioning radio resources in a wireless communication system. The present invention provides a method for configuring two types of radio resources, which include radio resources for device-to-device (D2D) communication between user equipments (UEs) and radio resources for communication between a UE and eNodeB (eNB). The present invention provides a method for performing D2D communication by using radio resources for D2D communication.

In an aspect, a method for configuring, by a user equipment (UE), radio resources for a device-to-device (D2D) operation in a wireless communication system is provided. The method includes configuring two types of radio resources which include a first type of radio resources and a second type of radio resources, receiving a D2D radio network temporary identifier (D-RNTI) for D2D communication, and performing the D2D communication by using the first type of radio resources. The first type of radio resources is used for the D2D communication, and the second type of radio resources is used for communication between the UE and a network.

In another aspect, a user equipment (UE) in a wireless communication system is provided. The UE includes a radio frequency (RF) unit for transmitting or receiving a radio signal, and a processor coupled to the RF unit, and configured to configure two types of radio resources which include a first type of radio resources and a second type of radio resources, receive a device-to-device (D2D) radio network temporary identifier (D-RNTI) for D2D communication, and perform the D2D communication by using the first type of radio resources. The first type of radio resources is used for the D2D communication, and the second type of radio resources is used for communication between the UE and a network.

Radio resources for D2D communication can be configured effectively.

DESCRIPTION OF EXEMPLARY
EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). $3^{rd}$ generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

For clarity, the following description will focus on LTE-A. However, technical features of the present invention are not limited thereto.

Figure 1:
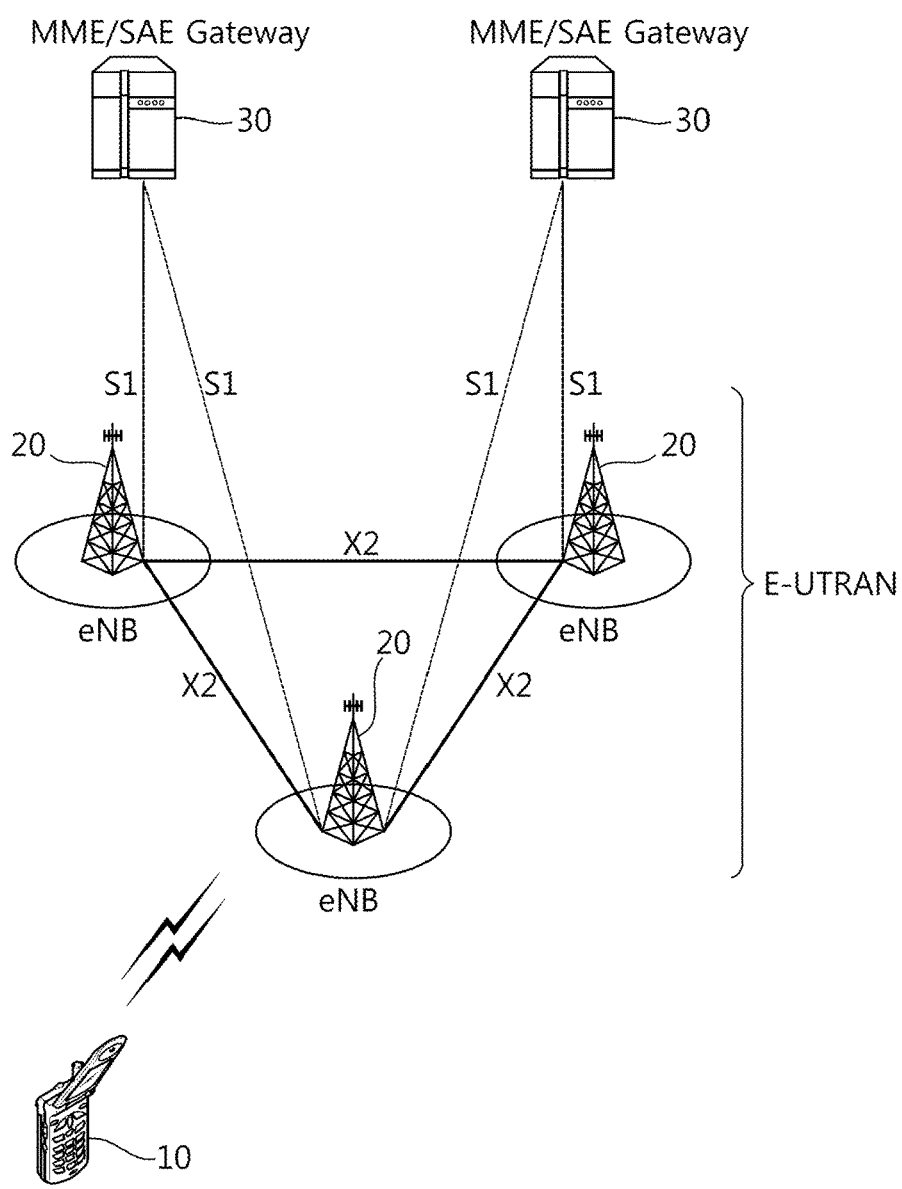
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), a base transceiver system (BTS), an access point, etc. One eNB 20 may be deployed per cell. There are one or more cells within the coverage of the eNB 20. A single cell is configured to have one of bandwidths selected from 1.25, 2.5, 5, 10, and 20 MHz, etc., and provides downlink or uplink transmission services to several UEs. In this case, different cells can be configured to provide different bandwidths.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) which is in charge of control plane functions, and a system architecture evolution (SAE) gateway (S-GW) which is in charge of user plane functions. The MME/S-GW 30 may be positioned at the end of the network and connected to an external network. The MME has UE access information or UE capability information, and such information may be primarily used in UE mobility management. The S-GW is a gateway of which an endpoint is an E-UTRAN. The MME/S-GW 30 provides an end point of a session and mobility management function for the UE 10. The EPC may further include a packet data network (PDN) gateway (PDN-GW). The PDN-GW is a gateway of which an endpoint is a PDN.

The MME provides various functions including non-access stratum (NAS) signaling to eNBs 20, NAS signaling security, access stratum (AS) security control, Inter core network (CN) node signaling for mobility between 3GPP access networks, idle mode UE reachability (including control and execution of paging retransmission), tracking area list management (for UE in idle and active mode), P-GW and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on APN-AMBR. For clarity MME/S-GW 30 will be referred to herein simply as a "gateway," but it is understood that this entity includes both the MME and S-GW.

Interfaces for transmitting user traffic or control traffic may be used. The UE 10 and the eNB 20 are connected by means of a Uu interface. The eNBs 20 are interconnected by means of an X2 interface. Neighboring eNBs may have a meshed network structure that has the X2 interface. The eNBs 20 are connected to the EPC by means of an S1 interface. The eNBs 20 are connected to the MME by means of an S1-MME interface, and are connected to the S-GW by means of S1-U interface. The S1 interface supports a many-to-many relation between the eNB 20 and the MME/S-GW.

Figure 2:
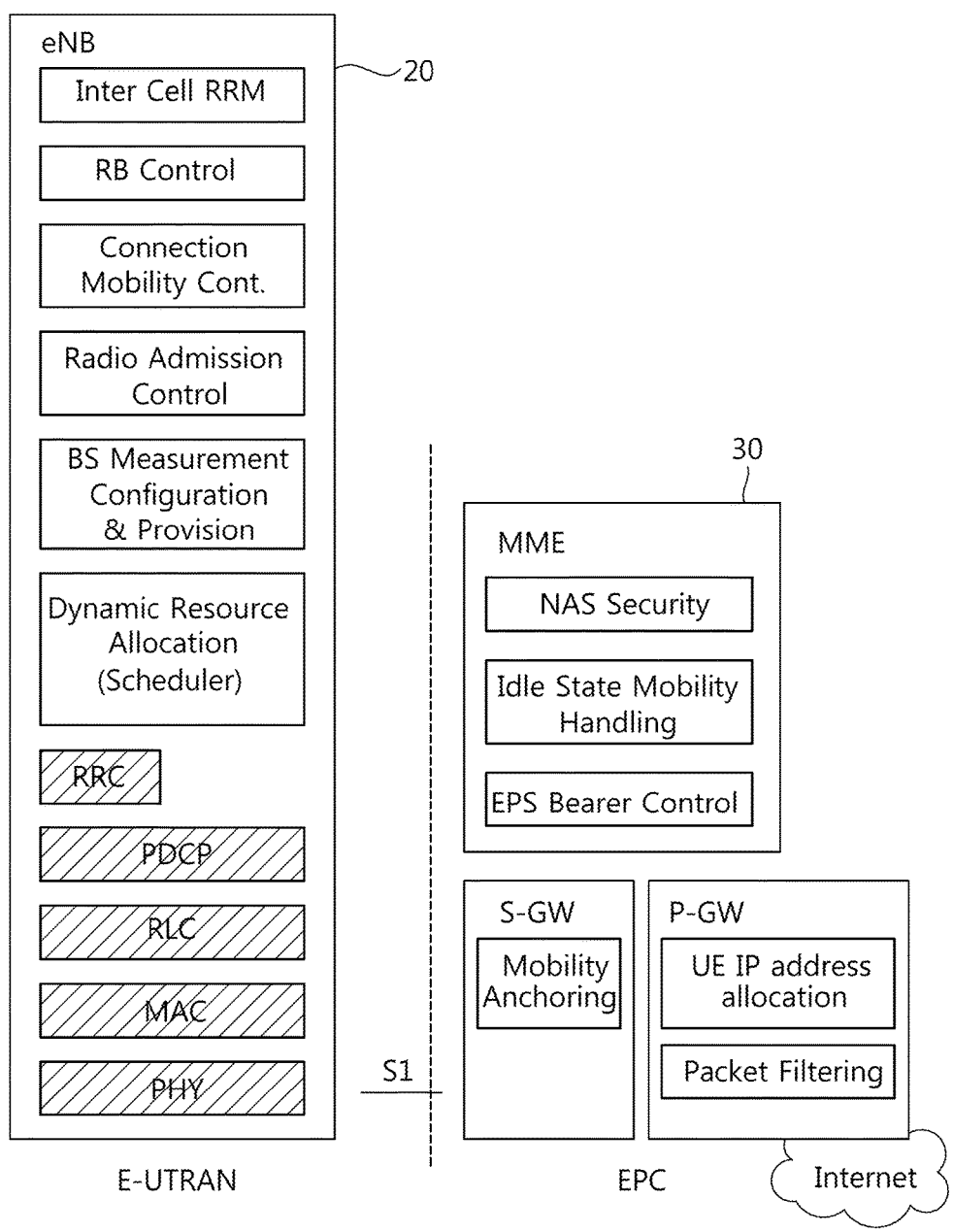
FIG. 2 shows a block diagram of architecture of a typical E-UTRAN and a typical EPC.

FIG. 2 shows a block diagram of architecture of a typical E-UTRAN and a typical EPC. Referring to FIG. 2, the eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 3:
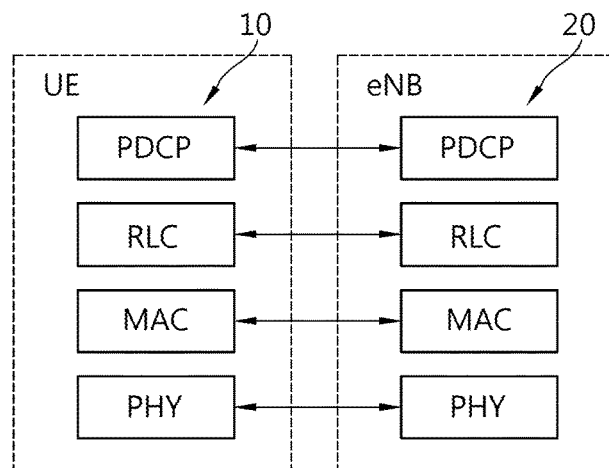
FIG. 3 shows a block diagram of a user plane protocol stack and a control plane protocol stack of an LTE system.
Figure 3:
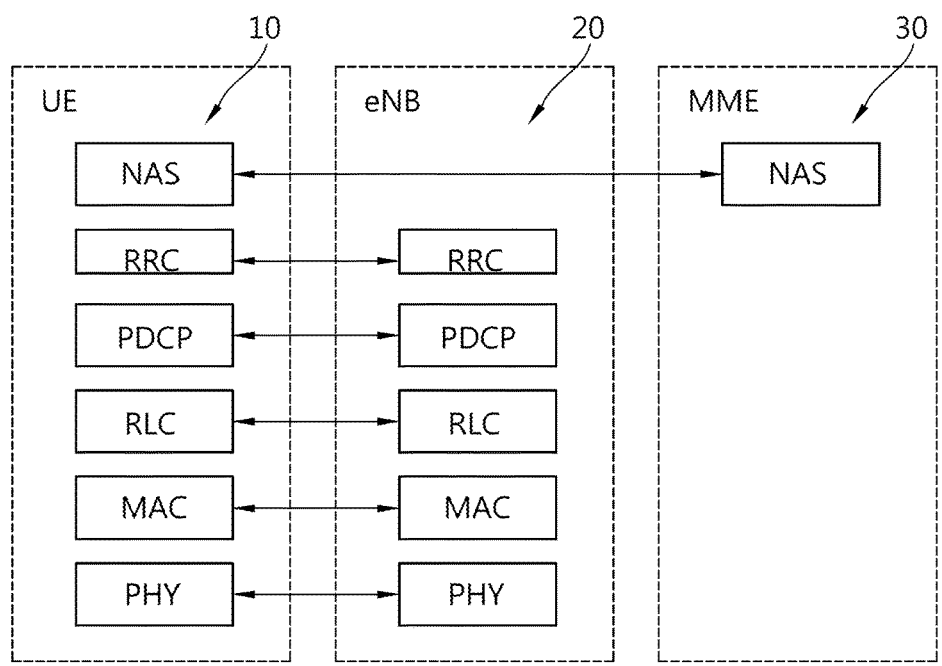

FIG. 3 shows a block diagram of a user plane protocol stack and a control plane protocol stack of an LTE system.

FIG. 3-(a) shows a block diagram of a user plane protocol stack of an LTE system, and FIG. 3-(b) shows a block diagram of a control plane protocol stack of an LTE system.

Layers of a radio interface protocol between the UE and the E-UTRAN may be classified into a first layer (L1), a second layer (L2), and a third layer (L3) based on the lower three layers of the open system interconnection (OSI) model that is well-known in the communication system. The radio interface protocol between the UE and the E-UTRAN may be horizontally divided into a physical layer, a data link layer, and a network layer, and may be vertically divided into a control plane (C-plane) which is a protocol stack for control signal transmission and a user plane (U-plane) which is a protocol stack for data information transmission. The layers of the radio interface protocol exist in pairs at the UE and the E-UTRAN, and are in charge of data transmission of the Uu interface.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data is transferred between the MAC layer and the PHY layer through the transport channel. Between different PHY layers, i.e., a PHY layer of a transmitter and a PHY layer of a receiver, data is transferred through the physical channel using radio resources. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH may carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ acknowledgement (ACK)/non-acknowledgement (NACK) signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

Figure 4:
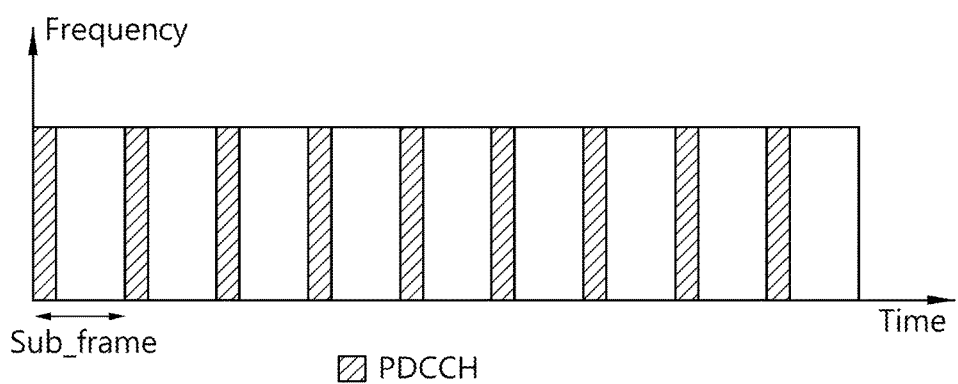
FIG. 4 shows an example of a physical channel structure.

FIG. 4 shows an example of a physical channel structure. A physical channel consists of a plurality of subframes in time domain and a plurality of subcarriers in frequency domain. One subframe consists of a plurality of symbols in the time domain. One subframe consists of a plurality of resource blocks (RBs). One RB consists of a plurality of symbols and a plurality of subcarriers. In addition, each subframe may use specific subcarriers of specific symbols of a corresponding subframe for a PDCCH. For example, a first symbol of the subframe may be used for the PDCCH. The PDCCH carries dynamic allocated resources, such as a physical resource block (PRB) and modulation and coding scheme (MCS). A transmission time interval (TTI) which is a unit time for data transmission may be equal to a length of one subframe. The length of one subframe may be 1 ms.

The transport channel is classified into a common transport channel and a dedicated transport channel according to whether the channel is shared or not. A DL transport channel for transmitting data from the network to the UE includes a broadcast channel (BCH) for transmitting system information, a paging channel (PCH) for transmitting a paging message, a DL-SCH for transmitting user traffic or control signals, etc. The DL-SCH supports HARQ, dynamic link adaptation by varying the modulation, coding and transmit power, and both dynamic and semi-static resource allocation. The DL-SCH also may enable broadcast in the entire cell and the use of beamforming. The system information carries one or more system information blocks. All system information blocks may be transmitted with the same periodicity. Traffic or control signals of a multimedia broadcast/multicast service (MBMS) may be transmitted through the DL-SCH or a multicast channel (MCH).

A UL transport channel for transmitting data from the UE to the network includes a random access channel (RACH) for transmitting an initial control message, a UL-SCH for transmitting user traffic or control signals, etc. The UL-SCH supports HARQ and dynamic link adaptation by varying the transmit power and potentially modulation and coding. The UL-SCH also may enable the use of beamforming. The RACH is normally used for initial access to a cell.

A MAC layer belongs to the L2. The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. A MAC sublayer provides data transfer services on logical channels.

The logical channels are classified into control channels for transferring control plane information and traffic channels for transferring user plane information, according to a type of transmitted information. That is, a set of logical channel types is defined for different data transfer services offered by the MAC layer. The logical channels are located above the transport channel, and are mapped to the transport channels.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RLC layer belongs to the L2. The RLC layer provides a function of adjusting a size of data, so as to be suitable for a lower layer to transmit the data, by concatenating and segmenting the data received from a higher layer in a radio section. In addition, to ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides a retransmission function through an automatic repeat request (ARQ) for reliable data transmission. Meanwhile, a function of the RLC layer may be implemented with a functional block inside the MAC layer. In this case, the RLC layer may not exist.

A packet data convergence protocol (PDCP) layer belongs to the L2. The PDCP layer provides a function of header compression function that reduces unnecessary control information such that data being transmitted by employing IP packets, such as IPv4 or IPv6, can be efficiently transmitted over a radio interface that has a relatively small bandwidth. The header compression increases transmission efficiency in the radio section by transmitting only necessary information in a header of the data. In addition, the PDCP layer provides a function of security. The function of security includes ciphering which prevents inspection of third parties, and integrity protection which prevents data manipulation of third parties.

A radio resource control (RRC) layer belongs to the L3. The RLC layer is located at the lowest portion of the L3, and is only defined in the control plane. The RRC layer takes a role of controlling a radio resource between the UE and the network. For this, the UE and the network exchange an RRC message through the RRC layer. The RRC layer controls logical channels, transport channels, and physical channels in relation to the configuration, reconfiguration, and release of RBs. An RB is a logical path provided by the L1 and L2 for data delivery between the UE and the network. That is, the RB signifies a service provided the L2 for data transmission between the UE and E-UTRAN. The configuration of the RB implies a process for specifying a radio protocol layer and channel properties to provide a particular service and for determining respective detailed parameters and operations. The RB is classified into two types, i.e., a signaling RB (SRB) and a data RB (DRB). The SRB is used as a path for transmitting an RRC message in the control plane. The DRB is used as a path for transmitting user data in the user plane.

Referring to FIG. 3-(a), the RLC and MAC layers (terminated in the eNB on the network side) may perform functions such as scheduling, automatic repeat request (ARQ), and hybrid automatic repeat request (HARQ). The PDCP layer (terminated in the eNB on the network side) may perform the user plane functions such as header compression, integrity protection, and ciphering.

Referring to FIG. 3-(b), the RLC and MAC layers (terminated in the eNB on the network side) may perform the same functions for the control plane. The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

An RRC state indicates whether an RRC layer of the UE is logically connected to an RRC layer of the E-UTRAN. The RRC state may be divided into two different states such as an RRC connected state and an RRC idle state. When an RRC connection is established between the RRC layer of the UE and the RRC layer of the E-UTRAN, the UE is in RRC_CONNECTED, and otherwise the UE is in RRC_IDLE. Since the UE in RRC_CONNECTED has the RRC connection established with the E-UTRAN, the E-UTRAN may recognize the existence of the UE in RRC_CONNECTED and may effectively control the UE. Meanwhile, the UE in RRC_IDLE may not be recognized by the E-UTRAN, and a CN manages the UE in unit of a TA which is a larger area than a cell. That is, only the existence of the UE in RRC_IDLE is recognized in unit of a large area, and the UE must transition to RRC_CONNECTED to receive a typical mobile communication service such as voice or data communication.

In RRC_IDLE state, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE state, no RRC context is stored in the eNB.

In RRC_CONNECTED state, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED state, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE state, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion.

A paging message is transmitted over all cells belonging to the same tracking area. If the UE moves from one TA to another TA, the UE will send a tracking area update (TAU) message to the network to update its location.

When the user initially powers on the UE, the UE first searches for a proper cell and then remains in RRC_IDLE in the cell. When there is a need to establish an RRC connection, the UE which remains in RRC_IDLE establishes the RRC connection with the RRC of the E-UTRAN through an RRC connection procedure and then may transition to RRC_CONNECTED. The UE which remains in RRC_IDLE may need to establish the RRC connection with the E-UTRAN when uplink data transmission is necessary due to a user's call attempt or the like or when there is a need to transmit a response message upon receiving a paging message from the E-UTRAN.

It is known that different cause values may be mapped to the signature sequence used to transmit messages between a UE and eNB and that either channel quality indicator (CQI) or path loss and cause or message size are candidates for inclusion in the initial preamble.

When a UE wishes to access the network and determines a message to be transmitted, the message may be linked to a purpose and a cause value may be determined. The size of the ideal message may be also be determined by identifying all optional information and different alternative sizes, such as by removing optional information, or an alternative scheduling request message may be used.

The UE acquires necessary information for the transmission of the preamble, UL interference, pilot transmit power and required signal-to-noise ratio (SNR) for the preamble detection at the receiver or combinations thereof. This information must allow the calculation of the initial transmit power of the preamble. It is beneficial to transmit the UL message in the vicinity of the preamble from a frequency point of view in order to ensure that the same channel is used for the transmission of the message.

The UE should take into account the UL interference and the UL path loss in order to ensure that the network receives the preamble with a minimum SNR. The UL interference can be determined only in the eNB, and therefore, must be broadcast by the eNB and received by the UE prior to the transmission of the preamble. The UL path loss can be considered to be similar to the DL path loss and can be estimated by the UE from the received RX signal strength when the transmit power of some pilot sequence of the cell is known to the UE.

The required UL SNR for the detection of the preamble would typically depend on the eNB configuration, such as a number of Rx antennas and receiver performance. There may be advantages to transmit the rather static transmit power of the pilot and the necessary UL SNR separately from the varying UL interference and possibly the power offset required between the preamble and the message.

The initial transmission power of the preamble can be roughly calculated according to the following formula:

Transmit power=TransmitPilot−RxPilot+ULInterference+Offset+SNRRequired

Therefore, any combination of SNRRequired, ULInterference, TransmitPilot and Offset can be broadcast. In principle, only one value must be broadcast. This is essentially in current UMTS systems, although the UL interference in 3GPP LTE will mainly be neighboring cell interference that is probably more constant than in UMTS system.

The UE determines the initial UL transit power for the transmission of the preamble as explained above. The receiver in the eNB is able to estimate the absolute received power as well as the relative received power compared to the interference in the cell. The eNB will consider a preamble detected if the received signal power compared to the interference is above an eNB known threshold.

The UE performs power ramping in order to ensure that a UE can be detected even if the initially estimated transmission power of the preamble is not adequate. Another preamble will most likely be transmitted if no ACK or NACK is received by the UE before the next random access attempt. The transmit power of the preamble can be increased, and/or the preamble can be transmitted on a different UL frequency in order to increase the probability of detection. Therefore, the actual transmit power of the preamble that will be detected does not necessarily correspond to the initial transmit power of the preamble as initially calculated by the UE.

The UE must determine the possible UL transport format. The transport format, which may include MCS and a number of resource blocks that should be used by the UE, depends mainly on two parameters, specifically the SNR at the eNB and the required size of the message to be transmitted.

In practice, a maximum UE message size, or payload, and a required minimum SNR correspond to each transport format. In UMTS, the UE determines before the transmission of the preamble whether a transport format can be chosen for the transmission according to the estimated initial preamble transmit power, the required offset between preamble and the transport block, the maximum allowed or available UE transmit power, a fixed offset and additional margin. The preamble in UMTS need not contain any information regarding the transport format selected by the EU since the network does not need to reserve time and frequency resources and, therefore, the transport format is indicated together with the transmitted message.

The eNB must be aware of the size of the message that the UE intends to transmit and the SNR achievable by the UE in order to select the correct transport format upon reception of the preamble and then reserve the necessary time and frequency resources. Therefore, the eNB cannot estimate the SNR achievable by the EU according to the received preamble because the UE transmit power compared to the maximum allowed or possible UE transmit power is not known to the eNB, given that the UE will most likely consider the measured path loss in the DL or some equivalent measure for the determination of the initial preamble transmission power.

The eNB could calculate a difference between the path loss estimated in the DL compared and the path loss of the UL. However, this calculation is not possible if power ramping is used and the UE transmit power for the preamble does not correspond to the initially calculated UE transmit power. Furthermore, the precision of the actual UE transmit power and the transmit power at which the UE is intended to transmit is very low. Therefore, it has been proposed to code the path loss or CQI estimation of the downlink and the message size or the cause value in the UL in the signature.

Proximity Services (ProSe) are described. It may be refer to 3GPP TR 23.703 V0.4.1 (2013-06). The ProSe may be a concept including a device-to-device (D2D) communication. Hereinafter, the ProSe may be used by being mixed with a device-to-device (D2D).

ProSe direct communication means a communication between two or more UEs in proximity that are ProSe-enabled, by means of user plane transmission using E-UTRA technology via a path not traversing any network node. ProSe-enabled UE means a UE that supports ProSe requirements and associated procedures. Unless explicitly stated otherwise, a ProSe-enabled UE refers both to a non-public safety UE and a public safety UE. ProSe-enabled public safety UE means a ProSe-enabled UE that also supports ProSe procedures and capabilities specific to public safety. ProSe-enabled non-public safety UE means a UE that supports ProSe procedures and but not capabilities specific to public safety. ProSe direct discovery means a procedure employed by a ProSe-enabled UE to discover other ProSe-enabled UEs in its vicinity by using only the capabilities of the two UEs with 3GPP LTE rel-12 E-UTRA technology. EPC-level ProSe discovery means a process by which the EPC determines the proximity of two ProSe-enabled UEs and informs them of their proximity.

When the registered public land mobile network (PLMN), ProSe direct communication path and coverage status (in coverage or out of coverage) are considered, there are a number of different possible scenarios. Different combinations of direct data paths and in-coverage and out-of-coverage may be considered.

Figure 5:
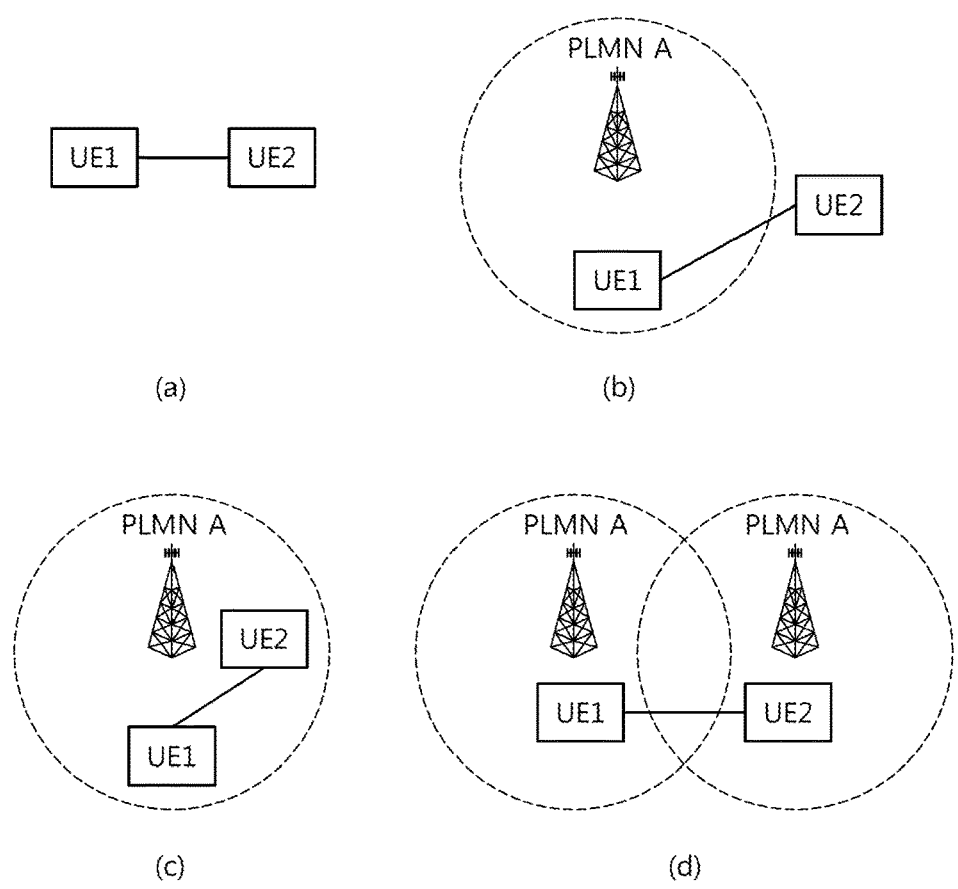
FIG. 5 and FIG. 6 show ProSe direct communication scenarios without a relay.
Figure 6:
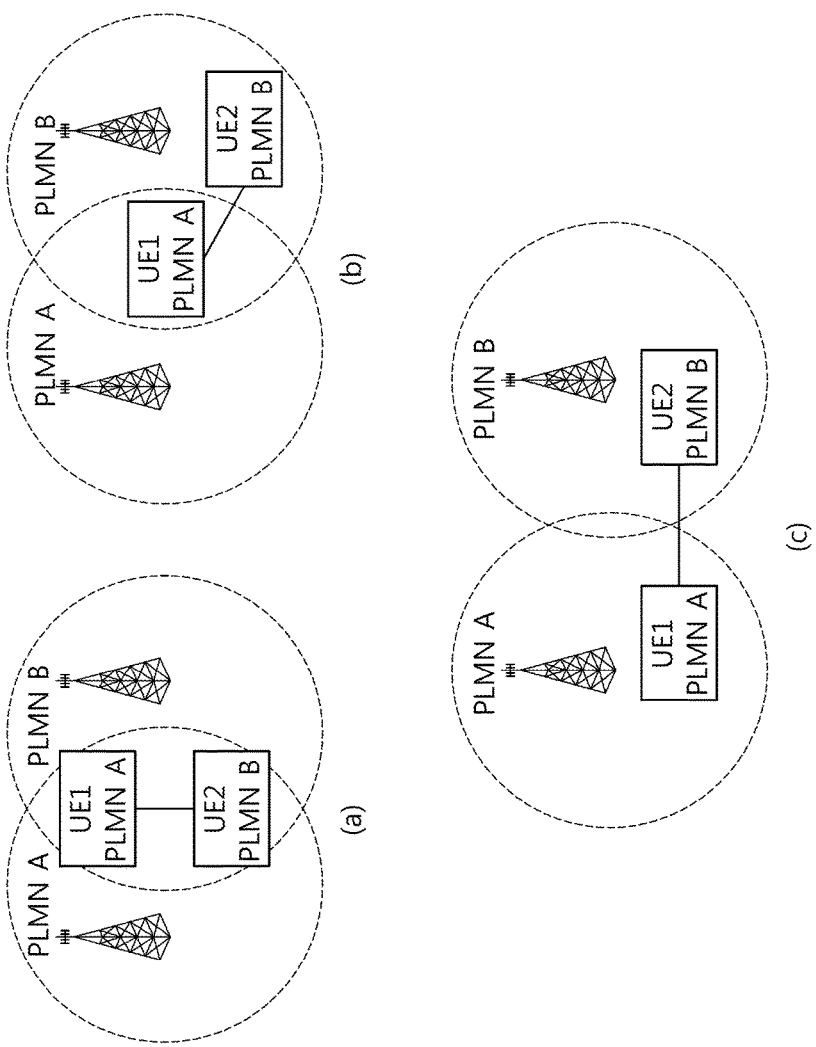

FIG. 5 and FIG. 6 show ProSe direct communication scenarios without a relay. FIG. 5-(a) shows a case that UE1 and UE2 are out of coverage. FIG. 5-(b) shows a case that UE1 is in coverage and in PLMN A, and UE2 is out of coverage. FIG. 5-(c) shows a case that UE1 and UE2 are in coverage and in PLMN A, and UE1 and UE2 shares the same PLMN A and the same cell. FIG. 5-(d) shows a case that UE1 and UE2 are in coverage and in the same PLMN A, but UE1 and UE2 are in different cells each other. FIG. 6-(a) shows a case that UE1 and UE2 are in coverage, but UE1 and UE2 are in different PLMNs (i.e., PLMN A/B) and different cells each other. UE1 and UE2 are in both cells' coverage. FIG. 6-(b) shows a case that UE1 and UE2 are in coverage, but UE1 and UE2 are in different PLMNs (i.e., PLMN A/B) and different cells each other. UE1 is in both cells' coverage and UE2 is in serving cell's coverage. FIG. 6-(c) shows a case that UE1 and UE2 are in coverage, but UE1 and UE2 are in different PLMNs (i.e., PLMN A/B) and different cells each other. UE1 and UE2 are in its own serving cell's coverage. In the description above, "in coverage and in PLMN A" means that the UE is camping on the cell of the PLMN A and under the control of the PLMN A.

Two different modes for ProSe direct communication one-to-one may be supported.

Network independent direct communication: This mode of operation for ProSe direct communication does not require any network assistance to authorize the connection and communication is performed by using only functionality and information local to the UE. This mode is applicable only to pre-authorized ProSe-enabled public safety UEs, regardless of whether the UEs are served by E-UTRAN or not.

Network authorized direct communication: This mode of operation for ProSe direct communication always requires network assistance and may also be applicable when only one UE is "served by E-UTRAN" for public safety UEs. For non-public safety UEs both UEs must be "served by E-UTRAN".

Figure 7:
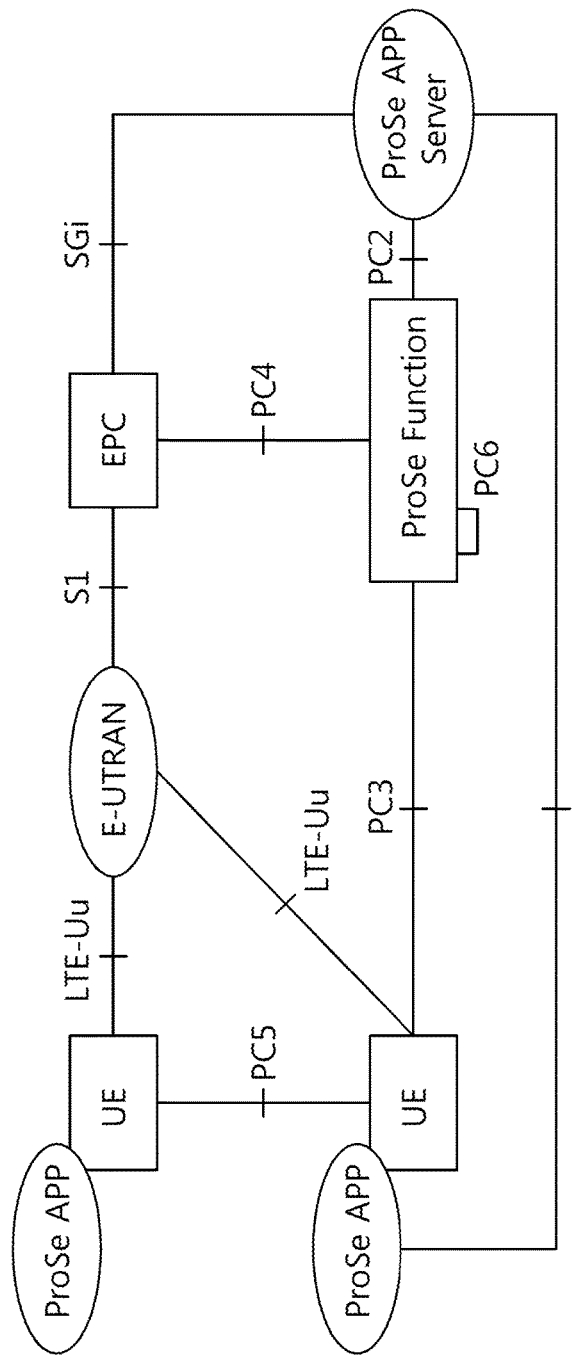
FIG. 7 shows reference architecture for ProSe.

FIG. 7 shows reference architecture for ProSe. Referring to FIG. 7, the reference architecture for ProSe includes E-UTRAN, EPC, a plurality of UEs having ProSe applications, ProSe application server, and ProSe function. The EPC represents the E-UTRAN core network architecture. The EPC may include entities such as MME, S-GW, P-GW, policy and charging rules function (PCRF), home subscriber server (HSS), etc. The ProSe application servers are users of the ProSe capability for building the application functionality. In the public safety cases, they may be specific agencies (PSAP), or in the commercial cases social media. These applications may be defined outside the 3GPP architecture but there may be reference points towards 3GPP entities. The application server can communicate towards an application in the UE. Applications in the UE use the ProSe capability for building the application functionality. Example may be for communication between members of public safety groups or for social media application that requests to find buddies in proximity.

The ProSe function in the network (as part of EPS) defined by 3GPP has a reference point towards the ProSe application server, towards the EPC and the UE. The functionality may include at least one of followings. But the functionality may not be restricted to the followings.

Interworking via a reference point towards the 3rd party applications

Authorization and configuration of the UE for discovery and direct communication Enable the functionality of the EPC level ProSe discovery ProSe related new subscriber data and handling of data storage, and also handling of ProSe identities Security related functionality Provide control towards the EPC for policy related functionality Provide functionality for charging (via or outside of EPC, e.g., offline charging)

Reference points/interfaces in the reference architecture for ProSe are described.

PC1: It is the reference point between the ProSe application in the UE and in the ProSe application server. It is used to define application level signaling requirements.

PC2: It is the reference point between the ProSe application server and the ProSe function. It is used to define the interaction between ProSe application server and ProSe functionality provided by the 3GPP EPS via ProSe function. One example may be for application data updates for a ProSe database in the ProSe function. Another example may be data for use by ProSe application server in interworking between 3GPP functionality and application data, e.g., name translation.

PC3: It is the reference point between the UE and ProSe function. It is used to define the interaction between UE and ProSe function. An example may be to use for configuration for ProSe discovery and communication.

PC4: It is the reference point between the EPC and ProSe function. It is used to define the interaction between EPC and ProSe function. Possible use cases may be when setting up a one-to-one communication path between UEs or when validating ProSe services (authorization) for session management or mobility management in real time.

PC5: It is the reference point between UE to UE used for control and user plane for discovery and communication, for relay and one-to-one communication (between UEs directly and between UEs over LTE-Uu).

PC6: This reference point may be used for functions such as ProSe discovery between users subscribed to different PLMNs.

SGi: In addition to the relevant functions via SGi, it may be used for application data and application level control information exchange.

ProSe direct communication is a mode of communication whereby two public safety UEs can communicate with each other directly over the PC5 interface. This communication mode is supported when the UE is served by E-UTRAN and when the UE is outside of E-UTRA coverage.

The ProSe-enabled UE may operate in two modes for resource allocation. In mode 1, resource allocation is scheduled by the eNB. In mode 1, the UE may need to be RRC_CONNECTED in order to transmit data. The UE may request transmission resources from the eNB. The eNB may schedule transmission resources for transmission of scheduling assignment(s) and data. The UE may send a scheduling request (dedicated scheduling request (D-SR) or random access) to the eNB followed by a ProSe buffer status report (BSR). Based on the BSR, the eNB may determine that the UE has data for a ProSe direct communication transmission and estimate the resources needed for transmission. In mode, 2, a UE on its own selects resources autonomously from resource pools to transmit scheduling assignment and data. If the UE is out of coverage, the UE may only use mode 2. If the UE is in coverage, the UE may use mode 1 or mode 2 according to configuration of the eNB. When there are no exceptional conditions, the UE may change from mode 1 to mode 2 or mode 2 to mode 1 only if it is configured by the eNB. If the UE is in coverage, the UE shall use only the mode indicated by eNB configuration unless one of the exceptional cases occurs.

ProSe direct discovery is defined as the procedure used by the ProSe-enabled UE to discover other ProSe-enabled UE(s) in its proximity using E-UTRA direct radio signals via the PC5 interface. ProSe direct discovery is supported only when the UE is served by E-UTRAN.

There are two types of resource allocation for discovery information announcement. Type 1 is a resource allocation procedure where resources for announcing of discovery information are allocated on a non UE specific basis. The eNB may provide the UE(s) with the resource pool configuration used for announcing of discovery information. The configuration may be signaled in system information block (SIB). The UE autonomously selects radio resource(s) from the indicated resource pool and announce discovery information. The UE may announce discovery information on a randomly selected discovery resource during each discovery period. Type 2 is a resource allocation procedure where resources for announcing of discovery information are allocated on a per UE specific basis. The UE in RRC_CONNECTED may request resource(s) for announcing of discovery information from the eNB via RRC. The eNB may assign resource(s) via RRC. The resources may be allocated within the resource pool that is configured in UEs for monitoring.

Figure 8:
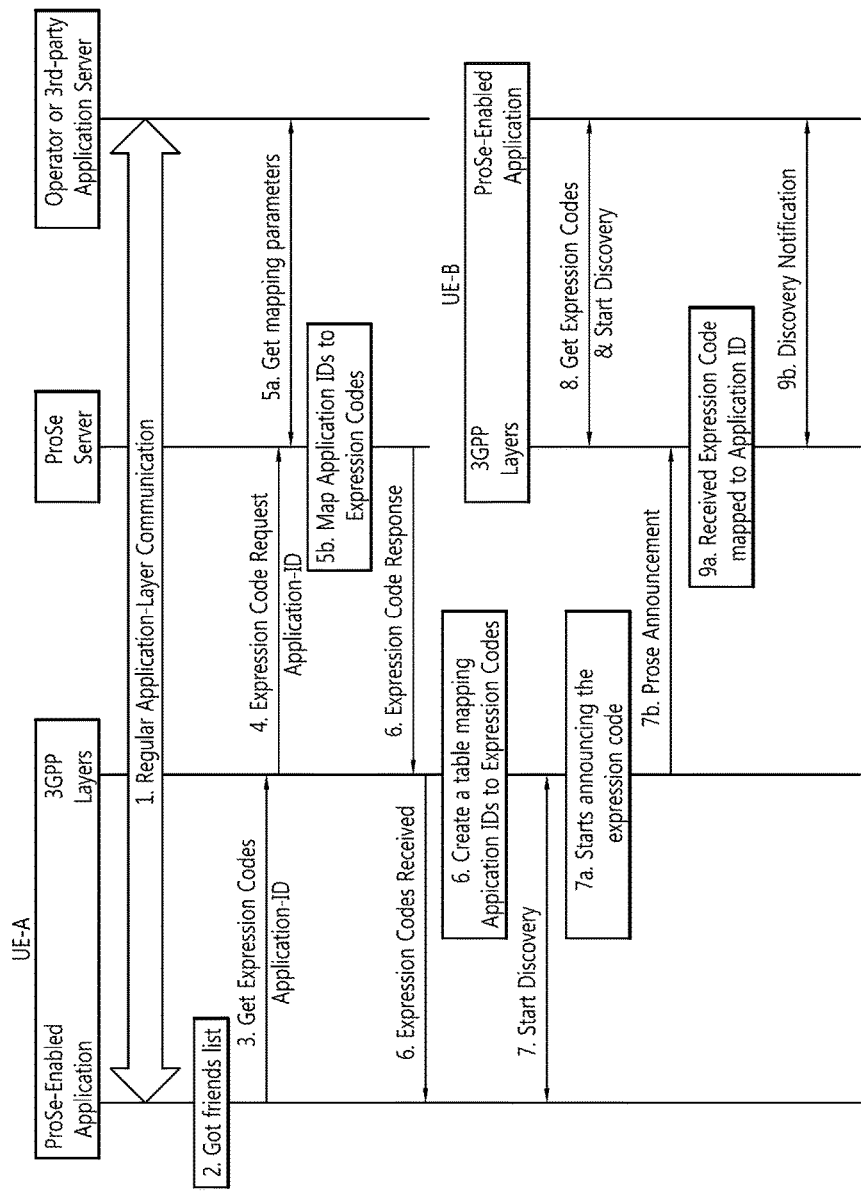
FIG. 8 shows an example of one-step ProSe direct discovery procedure.

FIG. 8 shows an example of one-step ProSe direct discovery procedure. In FIG. 8, two UEs are running the same ProSe-enabled application and it is assumed that the users of those UEs have a "friend" relationship on the considered application. The "3GPP Layers" shown in FIG. 8 correspond to the functionality specified by 3GPP that enables mobile applications in the UE to use ProSe discovery services.

UE-A and UE-B run a ProSe-enabled application, which discovers and connects with an associated application server in the network. As an example, this application could be a social networking application. The application server could be operated by the 3GPP network operator or by a third-party service provider. When operated by a third-party provider, a service agreement is required between the third-party provider and the 3GPP operator in order to enable communication between the ProSe Server in the 3GPP network and the application server.

1. Regular application-layer communication takes place between the mobile application in UE-A and the application server in the network.

2. The ProSe-enabled application in UE-A retrieves a list of application-layer identifiers, called "friends". Typically, such identifiers have the form of a network access identifier.

3. The ProSe-enabled application wants to be notified when one of UE-A's friends is in the vicinity of UE-A. For this purpose, it requests from the 3GPP layers to retrieve private expressions codes (i) for the user of UE-A (with an application-layer identity) and (ii) for each one of his friends.

4. The 3GPP layers delegate the request to a ProSe server in the 3GPP network. This server can be located either in home PLMN (HPLMN) or in a visited PLMN (VPLMN). Any ProSe server that supports the considered application can be used. The communication between the UE and ProSe server can take place either over the IP layer or below the IP layer. If the application or the UE is not authorized to use ProSe discovery, then the ProSe server rejects the request.

5. The ProSe server maps all provided application-layer identities to private expression codes. For example, the application-layer identity is mapped to the private expression code. This mapping is based on parameters retrieved from the application server in the network (e.g., mapping algorithm, keys, etc.) thus the derived private expression code can be globally unique. In other words, any ProSe server requested to derive the private expression of the application-layer identity for a specific application, it will derive the same private expression code. The mapping parameters retrieved from the application server describe how the mapping should be done. In this step, the ProSe server and/or the application server in the network authorize also the request to retrieve expression codes for a certain application and from a certain user. It is ensured, for example, that a user can retrieves expression codes only for his friends.

6. The derived expression codes for all requested identities are sent to the 3GPP layers, where they are stored for further use. In addition, the 3GPP layers notify the ProSe-enabled application that expression codes for the requested identities and application have been successfully retrieved. However, the retrieved expression codes are not sent to the ProSe-enabled application.

7. The ProSe-enabled application requests from the 3GPP layers to start discovery, i.e., attempt to discover when one of the provided "friends" is in the vicinity of UE-A and, thus, direct communication is feasible. As a response, UE-A announces the expression code of the application-layer identity for the considered application. The mapping of this expression code to the corresponding application-layer identify can only be performed by the friends of UE-A, who have also received the expression codes for the considered application.

8. UE-B also runs the same ProSe-enabled application and has executed steps 3-6 to retrieve the expression codes for friends. In addition, the 3GPP layers in UE-B carry out ProSe discovery after being requested by the ProSe-enabled application.

9. When UE-B receives the ProSe announcement from UE-A, it determines that the announced expression code is known and maps to a certain application and to the application-layer identity. The UE-B can determine the application and the application identity that corresponds to the received expression code because it has also received the expression code for the application-layer identity (UE-A is included in the friend list of UE-B).

The steps 1-6 in the above procedure can only be executed when the UE is inside the network coverage. However, these steps are not required frequently. They are only required when the UE wants to update or modify the friends that should be discovered with ProSe direct discovery. After receiving the requested expression codes from the network, the ProSe discovery (steps 7 and 9) can be conducted either inside or outside the network coverage.

It is noted that an expression code maps to a certain application and to a certain application identity. Thus when a user runs the same ProSe-enabled application on multiple UEs, each UE announces the same expression code.

Figure 9:
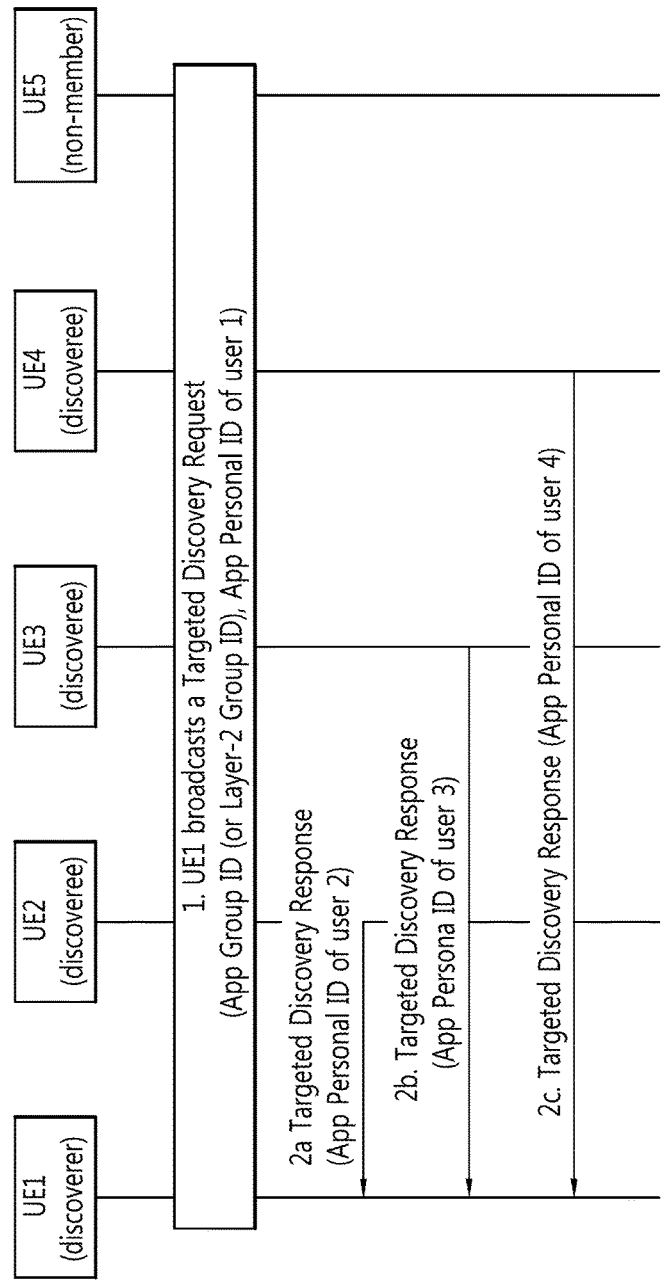
FIG. 9 shows an example of two-steps ProSe direct discovery procedure.

FIG. 9 shows an example of two-steps ProSe direct discovery procedure.

1. The user of UE1 (the discoverer) wishes to discover whether there are any members of a specific group communication service enabler (GCSE) group in proximity. UE1 broadcasts a targeted discovery request message containing the unique App group ID (or the Layer-2 group ID) of the targeted GCSE group. The targeted discovery request message may also include the discoverer's unique identifier (App personal ID of user 1). The targeted discovery request message is received by UE2, UE3, UE4 and UE5. Apart from the user of UE5, all other users are members of the requested GCSE group and their UEs are configured accordingly.

2a-2c. Each one of UE2, UE3 and UE4 responds directly to UE1 with a targeted discovery response message which may contain the unique App personal ID of its user. In contrast, UE5 sends no response message.

In three step procedure, UE1 may respond to the targeted discovery response message by sending a discovery confirm message.

Hereinafter, a method for configuring radio resources for a D2D operation according to an embodiment of the present invention is described. According to an embodiment of the present invention, for the UE that is interested in D2D service/operation, the UE may be configured with at least two types of radio resources for communication. This radio resource configuration may be provided by the eNB or group head that is responsible for managing resource assignment and usage within the group for D2D communication.

Figure 10:
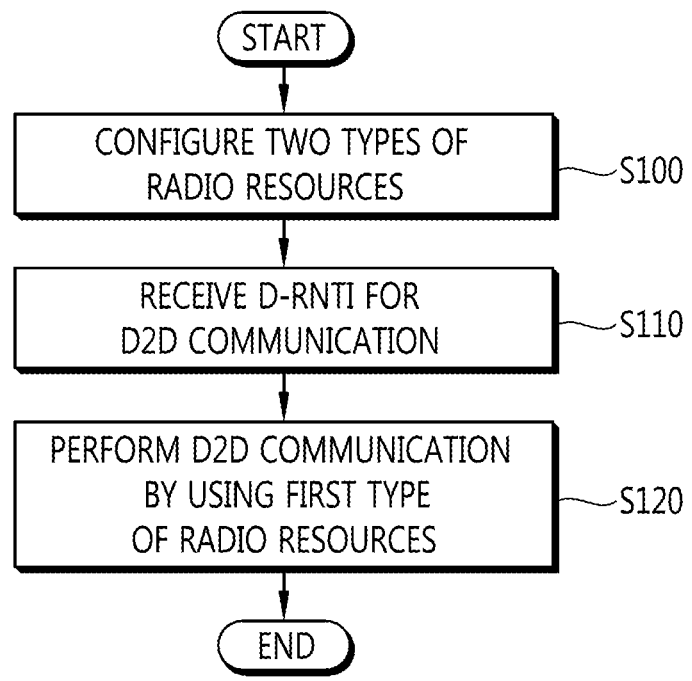
FIG. 10 shows an example of a method for configuring radio resources for a D2D operation according to an embodiment of the present invention.

FIG. 10 shows an example of a method for configuring radio resources for a D2D operation according to an embodiment of the present invention.

In step S100, the UE configures two types of radio resources which include a first type of radio resources and a second type of radio resources. The UE may configure two types of radio resources which have different usage each other. The first type of radio resources may be radio resources for D2D communication between UEs. The first type of radio resources may be used for D2D direct communication between UEs over PC5 interface. Transmission or reception using the first type of radio resources may not provide or expect feedback channels. That is, there may be no HARQ procedure in the MAC layer and no ARQ procedure in the RLC layer. The first type of radio resources may be used in a bidirectional way, which means that the first type of radio resource may be used for transmission and also for reception. For the first type of radio resources, the communication counterpart may include a UE serving UE-NW relaying functionality.

The second type of radio resources may be radio resources for communication between the UE and network. The second type of radio resources may be used for the UE to communicate with the eNB over Uu interface. Transmission or reception using the second type of radio resources may provide or expect feedback channels. That is, there may be HARQ procedure in the MAC layer and ARQ procedure in the RLC layer. The second type of radio resources may be used in a unidirectional way, which means that the second type of radio resource may be used for either uplink or downlink. For bidirectional communication on uplink and downlink, the UE should be configured with both uplink and downlink radio resources by TDD or FDD scheme.

It is desirable that the first type of radio resources and the second type of radio resources are separated from each other. That is, both types of radio resources may be orthogonal, not be overlapped with each other. However, both types of radio resources may be partially overlapped with each other. Both types of radio resources may be separated in time domain. For example, both types of radio resources may be separated in time domain by time-based partitioning information provided by the network. Alternatively, both types of radio resources may be separated in frequency domain. For example, both types of radio resources may be separated in frequency domain by frequency-based partitioning information provided by the network. Alternatively, both types of radio resources may be separated in time domain and frequency domain.

Separated radio resource sets for both types of radio resources may be provided to the UE via dedicated signaling (e.g., RRC signaling) or broadcast signaling (e.g., system information). That is, information on both types of radio resources may be indicated to the UE respectively. The separated radio resource sets for both types of radio resources may be provided with distinguishable name for each radio resources set. Alternatively, a type indication may be included in each radio resource set in order to indicate the type of radio resources. The second type of radio resources may be considered as default. Alternatively, a radio resource set for one of both types of radio resources may be provided to the UE via dedicated signaling or broadcast signaling. That is, information on one type of radio resources may be indicated to the UE. The remaining radio resources may be considered as a radio resource set for the remaining type of radio resources. Information on radio resources described above may be provided to the UE by the network or another UE (e.g., group owner UE). The method to distinguish types of radio resources described above may be not necessarily restricted to distinguish the first and second types of radio resources.

Back to FIG. 10, in step S110, the UE receives a D2D radio network temporary identifier (D-RNTI) for D2D communication. The D-RNTI is a newly defined identifier for using D2D resources, i.e., the first type of radio resources. The D-RNTI is a different identifier from a cell RNTI (C-RNTI). If the D-RNTI, which is received from an entity which grants D2D communication such as network or another UE (e.g., group owner UE), addresses the D2D communication, the UE may perform D2D communication by using D2D resources, i.e., the first type of radio resources. The D-RNTI may be received by being included in an uplink grant or downlink assignment. The D-RNTI may be only applicable for transmission. That is, the UE may need to get a grant via the D-RNTI from the network for D2D transmission. For reception of D2D communication, it may be up to UE implementation (the UE may monitor any time). The D-RNTI may be pre-allocated to the UE.

There may be various types of D-RNTIs to enable different kinds of grants for D2D communication as follows.

D_one-RNTI: The D_one-RNTI may provide the grant for D2D communication just for once. If the D_RNTI is used to control transmission, the network may transmit the D_one RNTI to the UE to grant transmission of D2D data (transport block). The rule defining which resource is associated with the grant may be configured by the network or pre-configured by the UE.

D_sps-RNTI: The D_sps-RNTI may provide the grant for D2D communication semi-persistently. That is, it may be assumed that multiple grants are provided periodically within duration. Together with the grant, at least one of total valid duration for the D_sps-RNTI, a periodicity of each grant during the total valid duration, or the number of max transmissions (max transport blocks) per each grant may be further configured by the network via broadcast signaling or dedicated signaling. That is, each grant may be valid for a specific periodicity. Alternatively, each grant may be valid until the network indicates to stop semi-persistent scheduling of D2D resources. For example, each grant may be valid until the network transmits a command of discarding D_sps-RNTI. The rule defining which resource is associated with each grant may be configured by the network or pre-configured by the UE.

D_duration_RNTI: The D_duration-RNTI may provide the grant for a defined period for D2D communication. When the UE is scheduled with the D_duration_RNTI, the maximum transport block size for one transmission may be provided by the D_duration-RNTI. Or, the maximum number of transmissions by the UE per each grant may be provided by the D_duration-RNTI. The UE may consider that the grant given by the D_duration-RNTI starts upon receiving control information addressed for the D_duration_RNTI. The UE may arbitrarily perform D2D communication during the duration. The rule defining which resource is associated with each grant may be configured by the network or pre-configured by the UE.

The D_one-RNTI, D_sps-RNTI, and D_duration-RNTI may be assigned to a single UE or a group of UEs by the eNB or group owner UE. Or, each D-RNTI may be assigned to a single UE for contention free resource usage among UEs. Or, the same D-RNTI may be assigned to multiple UEs for non-contention free resources usage among UEs.

Back to FIG. 10, in step S120, the UE performs the D2D communication by using the first type of radio resources. Upon receiving control information addressed by the D-RNTI, the UE may consider that the first type of radio resources can be used for D2D communication. Accordingly, the UE may use the first type of radio resources for D2D communication. The detailed information indicating which resource to use among the first type of radio resources may be provided in the control message including the D-RNTI. Even though not described in FIG. 10, if the normal RNTI, i.e., C-RNTI, addresses the communication, the UE may perform communication by using the second type of radio resources.

When the UE utilizes the first type radio resources for communication, it may not provide feedback to the communication counterpart, and it does not expect that there is feedback from the communication counterpart. For example, if the UE transmits data using the first type of radio resources, it may not expect that there is HARQ ACK/NACK or RLC ACK/NACK from the receiver of the data. If the UE receives data using the first type of radio resources, it may not provide HARQ ACK/NACK or RLC ACK/NACK to the transmitter of the data. When the UE utilizes the second type of radio resources for communication, it may not provide feedback to the communication counterpart (for reception), and it may not expect that there is feedback from the communication counterpart (for transmission).

Figure 11:
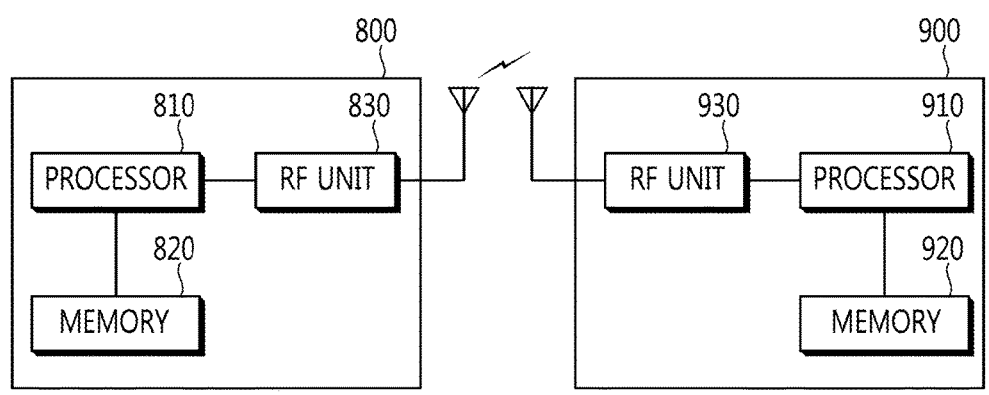
FIG. 11 is a block diagram showing wireless communication system to implement an embodiment of the present invention.

FIG. 11 is a block diagram showing wireless communication system to implement an embodiment of the present invention.

An entity of the network 800 may include a processor 810, a memory 820 and a radio frequency (RF) unit 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

A UE 900 may include a processor 910, a memory 920 and a RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method for a user equipment (UE) in a wireless communication system, the method comprising:
   receiving a resource configuration which includes information on a first type of radio resources and a second type of radio resources, from an eNodeB (eNB), wherein the second type of radio resources are orthogonal to the first type of radio resources;
   configuring the first type of radio resources and the second type of radio resources according to the resource configuration;
   receiving a device-to-device (D2D) radio network temporary identifier (D-RNTI) for D2D communication;
   performing the D2D communication by using the first type of radio resources; and
   performing a communication between the UE and the eNB by using the second type of radio resources,
   wherein the first type of radio resources does not provide a feedback channel and the second type of radio resources provides a feedback channel, and
   wherein the D-RNTI includes at least one of $D_{13}$ one-RNTI, $D_{13}$ sps-RNTI, or $D_{13}$ duration-RNTI.

2. The method of claim 1, wherein the first type of radio resources is able to be used for both transmission and reception, and
   wherein the second type of radio resources is able to be used for either transmission or reception.

3. The method of claim 1, wherein the first type of radio resources and the second type of radio resources are separated from each other in the time domain.

4. The method of claim 1, wherein the first type of radio resources and the second type of radio resources are separated from each other in the frequency domain.

5. The method of claim 1, wherein both the first type of radio resources and the second type of radio resources are separately configured by the network via dedicated signaling or broadcast signaling.

6. The method of claim 1, wherein the $D_{13}$ one-RNTI provides a one-time grant for the D2D communication.

7. The method of claim 1, wherein the $D_{13}$ sps-RNTI provides multiple grants for the D2D communication semi-persistently.

8. The method of claim 7, wherein each grant is valid for a specific period.

9. The method of claim 1, wherein the $D_{13}$ duration-RNTI provides a grant for the D2D communication for a specific duration.

10. The method of claim 9, wherein the grant provided by the $D_{13}$ duration-RNTI corresponds to a maximum transport block size for one transmission or a maximum number of transmissions per each grant.

11. The method of claim 1, wherein the D-RNTI is received via control information.

12. A user equipment (UE) in a wireless communication system, the UE comprising:
a transmitter and receiver; and
a processor, coupled to the transmitter and receiver, and configured to:
control the receiver to receive a resource configuration which includes information on a first type of radio resources and a second type of radio resources, from an eNodeB (eNB), wherein the second type of radio resources are orthogonal to the first type of radio resources;
configure the first type of radio resources and the second type of radio resources, according to the resource configuration;
control the receiver to receive a device-to-device (D2D) radio network temporary identifier (D-RNTI) for D2D communication;
perform the D2D communication by using the first type of radio resources; and
perform a communication between the UE and the eNB by using the second type of radio resources,
wherein the first type of radio resources does not provide a feedback channel and the second type of radio resources provides a feedback channel, and
wherein the D-RNTI includes at least one of $D_{13}$ one-RNTI, $D_{13}$ sps-RNTI, or $D_{13}$ duration-RNTI.

* * * * *